No. 814,480. PATENTED MAR. 6, 1906.
S. B. SAFFELL.
COMBINED MINNOW BUCKET AND TRAP.
APPLICATION FILED JULY 14, 1905.
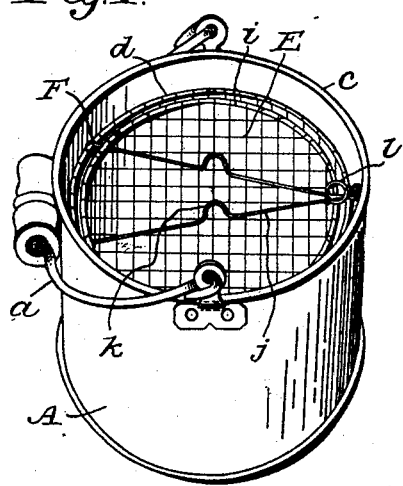
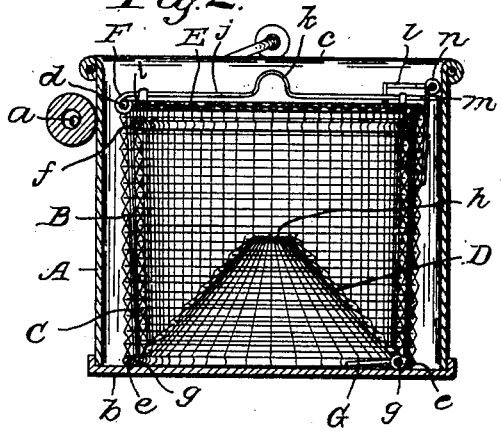
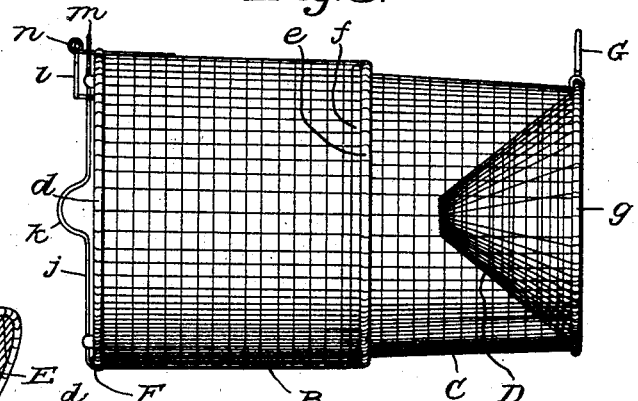
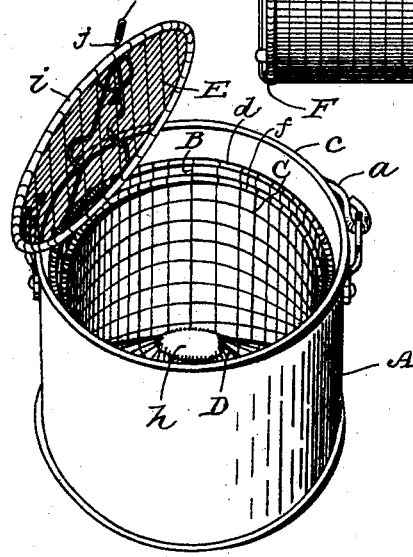
Witnesses:
D. L. Boyle.
Stella Snider.
Inventor:
Silas B. Saffell,
by
E. T. Silvius,
Attorney.

UNITED STATES PATENT OFFICE.

SILAS B. SAFFELL, OF INDIANAPOLIS, INDIANA.

COMBINED MINNOW BUCKET AND TRAP.

No. 814,480.          Specification of Letters Patent.          Patented March 6, 1906.

Application filed July 14, 1905. Serial No. 269,584.

*To all whom it may concern:*

Be it known that I, SILAS B. SAFFELL, a citizen of the United States, residing at Indianapolis, in the county of Marion and State of Indiana, have invented new and useful Improvements in a Combined Minnow Bucket and Trap; and I do declare the following to be a full, clear, and exact description of the invention, reference being had to the accompanying drawings, and to the letters of reference marked thereon, which form a part of this specification.

This invention relates to buckets and traps combined, so as to be convenient for carrying either empty or with minnows therein, the invention having particular reference to contractible traps for catching minnows and placing them in buckets of water and for retaining them while changing the water in the buckets.

Objects of the invention are to provide convenient minnow buckets and traps for the use of fishermen, whereby minnows for bait may be carried and whereby when a supply has been exhausted a fresh supply of minnows may be caught in the fishing-waters without loss of time, and a further object is to provide a minnow-trap of ample capacity that may be carried in compact form in the bucket when not in use as a trap and be useful in the bucket and also be easily returned from a fishing trip.

With the above-mentioned and other objects in view the invention consists in a novel form of contractible minnow-trap and a novel combination of the trap and a bucket; and the invention consists, further, in the parts and combinations and arrangements of parts, as hereinafter particularly described and claimed.

Referring to the drawings, Figure 1 is a perspective view of the complete bucket and trap; Fig. 2, a vertical central sectional view thereof; Fig. 3, a side view of the trap removed from the bucket and extended for use, and Fig. 4 a perspective view of the complete bucket and trap with the lid thereof open.

Similar reference characters in the various figures of the drawings designate corresponding elements or features.

In a practical embodiment of the invention a bucket of suitable dimensions is provided comprising a body part A, provided with a bail $a$ and having a flat bottom $b$, the top $c$ of the bucket being open. The bucket is of circular form, but may be made in other forms, if desired.

Within the bucket a contracted trap of basket-like form is arranged that rests on the bottom $b$ thereof, the trap as thus arranged comprising advantageous features of the bucket itself, the trap being composed of a section B and a section C of telescopic arrangement one with the other, each section being composed principally of wire-netting, (or may be of perforated sheet metal.) The section B has a top ring $d$ and a bottom ring $e$, both rings being attached to the netting and forming frame members, the bottom ring having less diameter than the top ring of the section. The section C has a top ring $f$ and a bottom ring $g$, both rings being attached to the netting of the section and forming frame members therefor. The ring $f$ has a greater diameter externally than the internal diameter of the ring $e$, and the external diameter of the ring $g$ is less than the internal diameter of the ring $e$. The section C has a dished end D of funnel-shape contour attached at its larger end to the ring $g$ and having an opening $h$ in its smaller end, which is near the center of the section, wire-netting being employed in the formation thereof. After constructing the two sections B and C the section C is placed within the other section and may be pushed through the smaller end thereof, as in Fig. 3, the two sections being held closely together by frictional contact one with the other.

The larger end part of the section B has an end E, connected by a hinge F to the ring $d$ thereof and composed principally of wire-netting attached to a ring $i$, the end E being provided with a brace $j$, having one or more loops $k$, serving as handles, and the end also has a movable fastener $l$ and a slotted hasp $m$ connected thereto at its edge opposite to the hinge, the hasp receiving an eye $n$, that is attached to the section B and designed to receive the fastener when projecting through the hasp. The end E serves as a lid for the minnow-receptacle when the trap is contracted and in the bucket, and it forms the terminal end of the trap when arranged to be used as a trap. The smaller end of the section C has a suitable device G connected movably to the ring $g$ thereof, adapted to have a cord connected thereto for controlling the trap when placing it into the water and drawing it therefrom in trapping the minnows.

The device may be loop shape or of similar form.

The fastener $l$ may be of any suitable construction and preferably is formed of wire bent loosely about the brace $j$ so as to move freely and also bent to form a hook that may be inserted into the eye $n$.

In practical use the bucket and trap combined, as in Fig. 1, may be carried by the fisherman as a receptacle for lunch to the fishing-grounds. Then the trap device may be removed from the bucket and extended, as in Fig. 3, and placed in the water, being baited, if desired. The minnows will swim into the funnel-shape end through the opening $h$ and remain in the trap, which may then be removed from the water and contracted and placed in the bucket in which water will be placed. When fresh water may be required, the stale water may be poured out of the bucket and fresh water be dipped up from the stream by the bucket. By raising the lid, as in Fig. 4, access may be had to the minnows for taking them for bait. All main parts being separable may be easily cleansed before returning from the fishing trip.

Having thus described the invention, what is claimed as new is—

1. A minnow-trap comprising two telescopic sections of different diameters, each section being smaller at one end than at the other end, the larger section having a ring in the smaller end thereof, and the smaller section having a ring outside of the larger end thereof, one end of one section being closed by netting, and one end of the other section having a funnel-shape end formed of netting with an opening therein to receive the minnows.

2. A combined minnow bucket and trap including a water vessel provided therein with a removable basket-like minnow-receptacle comprising telescopic sections of which one section has a funnel-shape end serving as a trap for the minnows and another section of which has a hinged closure end opposing the funnel-shape end and also serving as a movable lid for the minnow-receptacle when in the water vessel.

3. A combined minnow bucket and trap comprising an open-top water vessel having a bail, a basket-like telescopic minnow trap and receptacle consisting of a section having a hinged end provided with a fastener, and a section having a funnel-shape end and movable endwise in the other section and provided with a device to which a cord may be attached.

4. A combined minnow bucket and trap including a water vessel having a bail, a basket-like combined minnow receptacle and trap comprising a plurality of telescopic sections of different diameters, one section having a ring fixed in one end thereof, and another section having a ring fixed outside of an end thereof, one end of one section being closed by netting, and one end of another section having a funnel-shape end formed of netting with an opening therein to receive the minnows.

In testimony whereof I affix my signature in presence of two witnesses.

SILAS B. SAFFELL.

Witnesses:
  WM. H. PAYNE,
  E. T. SILVIUS.